UNITED STATES PATENT OFFICE.

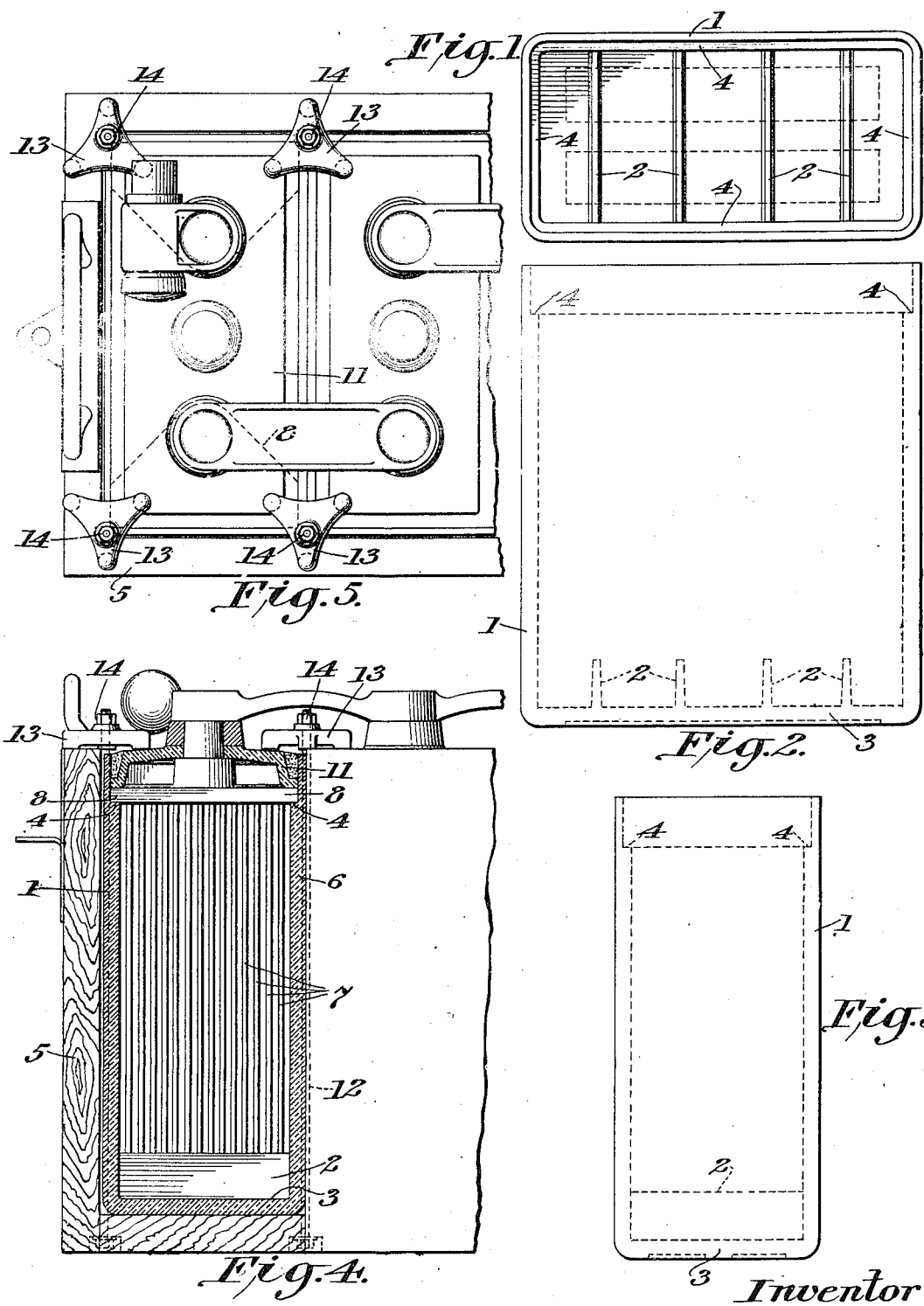

CHESTER M. ANGELL, OF CHICAGO, ILLINOIS, ASSIGNOR TO VESTA ACCUMULATOR COMPANY, OF CHICAGO, ILLINOIS, A CORPORATION OF ILLINOIS.

BATTERY.

1,298,857.  Specification of Letters Patent.  Patented Apr. 1, 1919.

Application filed January 3, 1919. Serial No. 269,458.

*To all whom it may concern:*

Be it known that I, CHESTER M. ANGELL, a citizen of the United States, residing at Chicago, in the county of Cook and State of Illinois, have invented certain new and useful Improvements in Batteries, of which the following is a specification.

The present invention relates to accumulator batteries and more particularly to batteries specially adapted for use on vehicles.

In the usual cell assembly the two groups of positive and negative plates are solely supported on the hard rubber ribs projecting upward from the bottom of the jar. While such support is entirely adequate under ordinary conditions of use, it has been found the groups of battery plates in truck service are very liable to be jolted down on these ribs due to the severe vibrations. In some cases the ribs have cut up into the groups of plates to such an extent as to throw out a large amount of the active material held in the grid openings as well as to allow the group as a whole to settle down into the sediment chambers about the ribs and short circuit themselves in the mud.

It is the object of the invention to provide a simple battery structure which is capable of withstanding the heavy jolts and vibrations incident to truck service.

To this end the invention consists briefly in the provisions of means for additionally supporting the plates so as to relieve, at least in part, the pressure exerted by the plates on the ribs and consequently the counter pressure exerted by the ribs on the plates and additionally in positive means for preventing relative motion between the plates and the casing.

For a fuller understanding of the invention reference is had to the accompanying drawings in which Figures 1, 2 and 3 are a plan view, side elevation and end elevation, respectively of a battery casing forming a part of the invention;

Fig. 4 is a sectional view of a battery showing the parts in assembled condition; and Fig. 5 is a plan view thereof.

Figs. 1, 2 and 3 show a cell casing 1 provided with the usual ribs 2 projecting up from the bottom wall 3. The side walls are recessed adjacent the upper end thereof to form a continuous ledge 4 contiguously to the inner surface.

In Figs. 4 and 5, which are fragmentary views of a battery comprising several cells, 5 represents a wooden box in which the hard rubber cell jars 6 are contained. The plates 7 are connected in the usual manner to a plate strap 8 and rest on ribs 2. For the sake of clearness only one group of plates is shown in Fig. 4. The strap 8 projects out at the sides and preferably also at the end and rests on the ledge 4 which extends completely around the four walls of the jar.

The two groups of plates are in practice locked together by an isolator (not shown) so that the plates form a single mechanical structural unit.

I have found that the damage done to the plates is attributable in many instances to looseness between the plates and the jar. If the plates are not rigidly connected to the jar, a slight play not even noticeable in the beginning may lead to speedy destruction of the plates in the manner referred to. As the vibrations occur, the plates are subjected to impacts alternating in upward and downward direction. If there is a slight play, the plates will move upwardly relatively to the jar and come down upon the ribs at the bottom of the jar with a force which is proportional to their weight and the rate of movement relative to the jar. Since the plates are relatively soft, this force is sufficient to cause a slight indentation therein which in turn increases the play in the jar. The increase of the play necessarily increases the force of the impact of the plates on the ribs so that in a comparatively short time the usefulness of the battery is destroyed.

In order to prevent initial play in a positive manner and thereby eliminate the principal factor from which looseness is developed in the cell assembly, means are provided for holding the plate strap to its seat upon the ledge. While various means are available for the particular purpose, preference is given to the structure disclosed. The downward force is transmitted through the one-piece hard rubber cover 11. Tie rods 12 are anchored in the bottom of the wooden box and extend upwardly through the corners between the cells and the wooden box. Triangular pieces 13 made of some material not affected by the acid are forced down upon the cover and held therein by nuts 14. The cover 11 in turn is thereby forced against the plate strap 8 and holds it rigidly against the ledge 4 under all conditions.

By the arrangement, which may be of course modified to some extent, the cell casing and the plates move up and down as a unit. The forces of the impacts are transmitted from the casing to the straps and from the straps to the casing so that the pressure action and reaction between the plates and the ribs is reduced to a relatively small amount. The straps are rigidly confined between the unyielding ledge 4 and the unyielding cover 11 to positively prevent play between the plate structure and the jar.

I claim:—

1. In an accumulator battery the combination with the casing, the plates and ribs at the bottom of the casing for supporting the plates, of means on the walls of the casing for supporting the plates and means for rigidly holding the plates to said supports.

2. In an accumulator battery the combination of a casing recessed at its upper portion to define a ledge contiguous to the inner surface, electrode plates, ribs at the bottom of the casing for supporting the plates, straps projecting laterally from the electrodes and resting on said ledge, and means for rigidly holding the straps on said ledge.

3. In an accumulator battery the combination of a casing recessed at its upper portion to define a ledge contiguous to the inner surface, electrode plates, ribs at the bottom of the casing for supporting the plates, straps projecting laterally from the electrodes and resting on said ledge, a one piece cover seated on the said straps and means for rigidly connecting the casing, the strap and the cover.

4. In an accumulator battery the combination of a casing recessed at its upper portion to define a ledge contiguous to the inner surface, electrode plates, ribs at the bottom of the casing for supporting the plates, straps projecting laterally from the electrodes and resting on said ledge, a one piece cover seated on the said strap, and clamping means acting on the casing and the cover to rigidly hold the latter against the straps.

In testimony whereof, I affix my signature.

CHESTER M. ANGELL.